United States Patent [19]

Cervin

[11] 4,303,363

[45] Dec. 1, 1981

[54] WORK FACILITATING APPARATUS FOR CONVEYING BUILDING MATERIAL FROM A HIGHER TO A LOWER LEVEL

[75] Inventor: Carl G. Cervin, Malmö, Sweden

[73] Assignee: Cervinter AB, Malmö, Sweden

[21] Appl. No.: 954,174

[22] Filed: Oct. 24, 1978

[30] Foreign Application Priority Data

Oct. 31, 1977 [SE] Sweden ................................. 7712256

[51] Int. Cl.$^3$ .......................... E04G 21/14; F27D 1/16
[52] U.S. Cl. ...................................... 414/10; 52/749;
198/466; 198/491; 198/801; 198/812; 264/30;
266/281; 414/564; 432/3
[58] Field of Search .................... 414/10, 564; 52/747,
52/749; 264/30; 266/281; 432/3; 182/128, 142;
198/801, 810, 812, 464, 491, 571, 572, 575, 460,
466

[56] References Cited

U.S. PATENT DOCUMENTS

| | | | |
|---|---|---|---|
| 1,901,928 | 3/1933 | Olson | 198/466 |
| 2,969,867 | 1/1961 | McClelland | 198/801 X |
| 3,033,389 | 5/1962 | Abarotin et al. | 414/10 |
| 3,285,390 | 11/1966 | Puxkandl et al. | 414/10 |
| 3,601,245 | 8/1971 | Munroe | 414/10 |
| 4,033,463 | 7/1977 | Cervin | 414/10 |
| 4,109,780 | 8/1978 | Halsey | 198/466 |

FOREIGN PATENT DOCUMENTS

1129263 5/1962 Fed. Rep. of Germany ...... 266/281

*Primary Examiner*—James L. Rowland
*Attorney, Agent, or Firm*—Wenderoth, Lind & Ponack

[57] ABSTRACT

An apparatus having an upper frame with a depending, telescopically elongatable and shortenable suspended structure for supporting at the lower end thereof a working platform in a converter or like metallurgical container, the upper frame being arranged to be supported at the upper end of the converter with the suspended structure extending down through an opening at the upper end of the converter. The apparatus has an endless conveyor which includes a vertical conveyor part extending from the upper frame to a point above the working platform, and a horizontal or inclined conveyor part situated outside the converter and the upper frame, the horizontal or inclined conveyor part permitting, upon elongation or shortening, shortening and elongation, respectively, of the vertical part of the endless conveyor. A device controls transfer of material from a conveyor device situated outside the converter, which can be the endless conveyor part outside the converter, so that the material is transferred in a controlled manner to an entrainment device associated with the vertical part of the conveyor.

15 Claims, 8 Drawing Figures

WORK FACILITATING APPARATUS FOR CONVEYING BUILDING MATERIAL FROM A HIGHER TO A LOWER LEVEL

BACKGROUND OF THE INVENTION

This invention relates to a work facilitating apparatus for conveying building material to a working place from a higher to a lower level near the place of use, particularly for conveying bricks for erection of inner walls such as the linings of converters, metallurgical furnaces, holding furnaces and the like.

U.S. Pat. No. 3,285,390 discloses a work facilitating apparatus for lining converters, which comprises a pair of endless conveyors one of which is a vertical paternoster elevator which is supported by a vertically suspended framework extending down through an opening at the upper end of the converter to a level near the bottom thereof. The suspended framework is supported by means of an upper frame resting on the upper end of the converter and carries, in addition to the vertical paternoster elevator, a working platform with means for receiving material from the paternoster elevator and conveying the material to the inner side of the converter. The other endless conveyor in the form of a conveyor belt is located outside the converter and extends obliquely upwardly from ground or floor level to the upper end of the vertical paternoster elevator for conveying material to the downwardly travelling run of the vertical conveyor which receives the material and conveys it down to the working platform.

This prior art apparatus suffers from several drawbacks.

One drawback resides in that the vertically suspended framework and the vertical paternoster elevator are of invariable length and that the working platform is vertically adjustable along the vertically suspended framework and the vertical paternoster elevator. When the vertically suspended framework and the vertical paternoster elevator are to be placed in and removed from the converter this must be done substantially in a vertical sense, which means that the available space above the upper end of the converter must be large enough to accommodate the entire length of the vertically suspended framework, or that the vertically suspended framework and the vertical paternoster elevator must be separable into sections, in which case the sections must be connected together above the converter when the vertical framework and its vertical paternoster elevator are suspended in the converter, or separated from one another when the vertical framework and its vertical paternoster elevator are to be removed from the converter.

Another drawback resides in that to permit being set at various working levels in the converter the working platform must be moved in relation to the vertical framework and in relation to the vertical paternoster elevator and be locked in each new position. In each working position the platform must be very securely locked to the vertically suspended framework to avoid the risk of the platform falling down, which might be a fall of up to 10 m or more. As the working platform must be set at its various height positions in relation to the vertically suspended framework, the vertical paternoster elevator has no definite material delivery end, that is the material is delivered on various levels along the vertical paternoster elevator depending upon the level at which the working platform is set. Irrespectively of the level at which the working platform is set between the lower and upper ends of the converter, the vertically suspended framework and the vertical paternoster elevator extend through the working platform down to a level at the bottom of the converter since the vertical framework and the vertical paternoster elevator are of invariable length. The means of the vertical paternoster elevator for conveying material must thus, after delivery of material to the working platform, continue their movements down to the lower end of the vertical paternoster elevator and from there up to the upper end of the elevator, which means that for a great part of the work done in the converter use is made of a vertical paternoster elevator which is of much too great a length in relation to the effective conveying distance.

A further serious drawback resides in that the outer endless conveyor by means of which the material is transferred to the vertical paternoster elevator delivers the material to entrainment means of the vertical paternoster elevator by dumping it from one to the other conveyor. This involves the great risk that material consisting of bricks weighing between 30 and 60 kg may fall down into the converter and hit the bottom of the converter or the working platform, breaking them into pieces or injuring the personnel on the working platform.

U.S. Pat. No. 4,033,463, describes a work facilitating apparatus in which use is made of an endless conveyor, one end portion of which forms a vertical conveyor part for conveying material inside the converter while the other end portion of the conveyor forms a horizontal or inclined conveyor part for substantially continuous conveyance of material. The conveyor according to this U.S. Patent thus forms a continuous conveying path the vertical path of which can be shortened by lengthening of the horizontal or inclined part, and vice versa. This will eliminate a risky material transfer from one conveyor to another.

The apparatus described in this U.S. Patent comprises a tubular supporting device which consists of telescopically extensible sections and which in a simple manner can be shortened and lengthened under simultaneous shortening and lengthening of the vertical part of the conveyor.

SUMMARY OF THE INVENTION

One object of the present invention is to modify and improve an apparatus of the type described in this U.S. Patent for conveying material to and through the upper end of a metallurgical holding furnace such as a converter, and downwardly inside the holding furnace towards the working platform which like the vertical conveyor part is supported by a depending framework.

Another object of the invention is to remove, in an apparatus of the type indicated, certain problems in connection with the conveyance of building material, such as bricks (stones) and mouldables to a converter or other metallurgical holding furnace through an opening at the upper end thereof to a receiving station inside the holding furnace above the working platform.

The apparatus of the present invention is thus equipped with a conveying system comprising an endless conveyor formed by a horizontal or inclined conveyor part merging into a vertical conveyor part which can be shortened or lengthened under simultaneous lengthening and shortening, respectively, of the horizontal or inclined conveyor part. The vertical conveyor part is supported by a vertically adjustable suspending structure which in turn is supported in depending manner from an upper frame and supports a working platform which is raisable and lowerable by shortening and lengthening, respectively, of the suspending structure. Further, the conveying system includes a receiving conveyor which is supported by the suspending structure and is located on a comfortable working level above the working platform for receiving the material conveyed downwardly by the endless conveyor to the receiving station and for transferring the material to the location at the inner side of the converter, where the material shall be laid to form a refractory lining.

According to the invention, the working platform is supported at the lower end of a suspended structure which can be telescopically lengthened and shortened and which consists of several coaxial tubes which are movable in each other an extend down through an upper opening in the metallurgical holding furnace such as a converter, to be provided with a refractory lining. The set of tubes, to the lower end of which the working platform is fixedly secured, is carried in a position depending through an upper opening of the converter by a frame which together with the telescopically elongatable and shortenable tube set constitutes a suspending structure for both the platform and the vertical conveyor part of the endless conveyor, which part extends from the upper frame down through the tube set to a material receiving station located on a comfortable working level above the working platform.

The horizontal or inclined conveyor part of the endless conveyor forms a continuous extension of the vertical conveyor part and extends from the upper frame in a direction away from the frame, and encompasses a movably supported deflection pulley which by being moved towards or away from the converter lengthens or shortens the vertical conveyor part under simultaneous shortening and lengthening, respectively, of the horizontal or inclined conveyor part. The lower end of the vertical conveyor part passes over a deflection pulley which is secured to the telescopically elongatable and shortenable tube set, and at the same time as the vertical conveyor part is lengthened and shortened, the tube set is lengthened or shortened and the working platform is lowered or raised.

In the transition area between the vertical and horizontal or inclined conveyor parts the endless conveyor is associated with a guiding device which, on the one hand, guides the material, which is conveyed from a horizontal or inclined direction to a vertical direction, from trailing or leading material-entrainment means and, on the other hand, prevents the material at the transition from the inclined or horizontal direction of conveyance to the vertical direction from sliding down onto the working platform.

In principle, the tube set could be shortened and lengthened by means of the endless conveyor, but it is preferred according to the present invention to connect the lowermost tube of the tube set to the upper frame by means of a telescoping cylinder unit, preferably of the hydraulic type. By lengthening or shortening the telescoping cylinder unit the tube set can be lengthened or shortened, simultaneously as the deflection pulley supported by a movable supporting device and deflecting the end of the inclined or horizontal conveyor path is moved such that the conveyor is kept stretched. The working platform, the tube set, the telescoping cylinder unit for lengthening and shortening the tube set and the device for lengthening and shortening the vertical part of the endless conveyor fundamentally agree with corresponding parts of the work facilitating apparatus described in U.S. Pat. No. 4,033,463, but are modified and improved in order to adapt the system to conveyance of material from above downwardly through a metallurgical holding furnace such as a converter.

In the apparatus according to the invention the telescoping cylinder unit between the upper frame and a lower section of the tube set constitutes a suspending structure for the tube set and the working platform and for the vertical conveyor part of the conveyor. The upper frame supporting these parts is preferably arranged to be carried on the upper end of the converter, which fundamentally agress with the manner in which the frame in the apparatus according to U.S. Pat. No. 3,285,390 is supported. As distinct from the last-mentioned apparatus, however, the apparatus according to the invention requires considerably less free space above a converter for mounting and removing the apparatus, and provides a considerably simpler and safer conveyance of material.

The apparatus according to the invention also comprises several improvements, particularly in the transition area between the inclined or horizontal conveying path and the vertical conveying path and for conveying the material from the lower part of the vertical conveying path to the place of laying the material at the inner side of the converter.

While the invention is described below as applied to a converter, it is readily understood that it is also applicable to other metallurgical holding furnaces which are lined with refractory linings which must be replaced from time to time with fresh refractory linings.

BRIEF DESCRIPTION OF THE DRAWINGS

The above and further improvements and features of the invention will not be described in greater detail below with references to the accompanying drawings in which.

DETAILED DESCRIPTION OF THE INVENTION

The drawings show a converter 1 which in conventional manner is pivotally mounted in a converter frame 2. The lower end 3 of the converter is of inverted cupola shape and its upper end is formed in this instance (which is customary) by an annular plate 4 which defines a central opening 5.

In the illustrated embodiment the upper end 4 of the converter is exploited for supporting an upper frame 6 which in turn supports a telescopically elongatable and shortenable suspending structure 7 for a working platform 8. The suspending structure 7 for a working platform is supported in depending position, that is the suspending structure 7 extends downwardly from the upper frame 6 through the central opening 5 of the converter 1 and carries the working platform 8 at its lower end.

The working platform 8 is preferably embodied as described in the above-mentioned U.S. Pat. No. 4,033,463 and is adjustable with regard to its outer diameter for adaptation of the platform to different inner diameters of the converter and to permit introduction of the platform through the upper opening 5 of the converter.

Figures 1, 3:
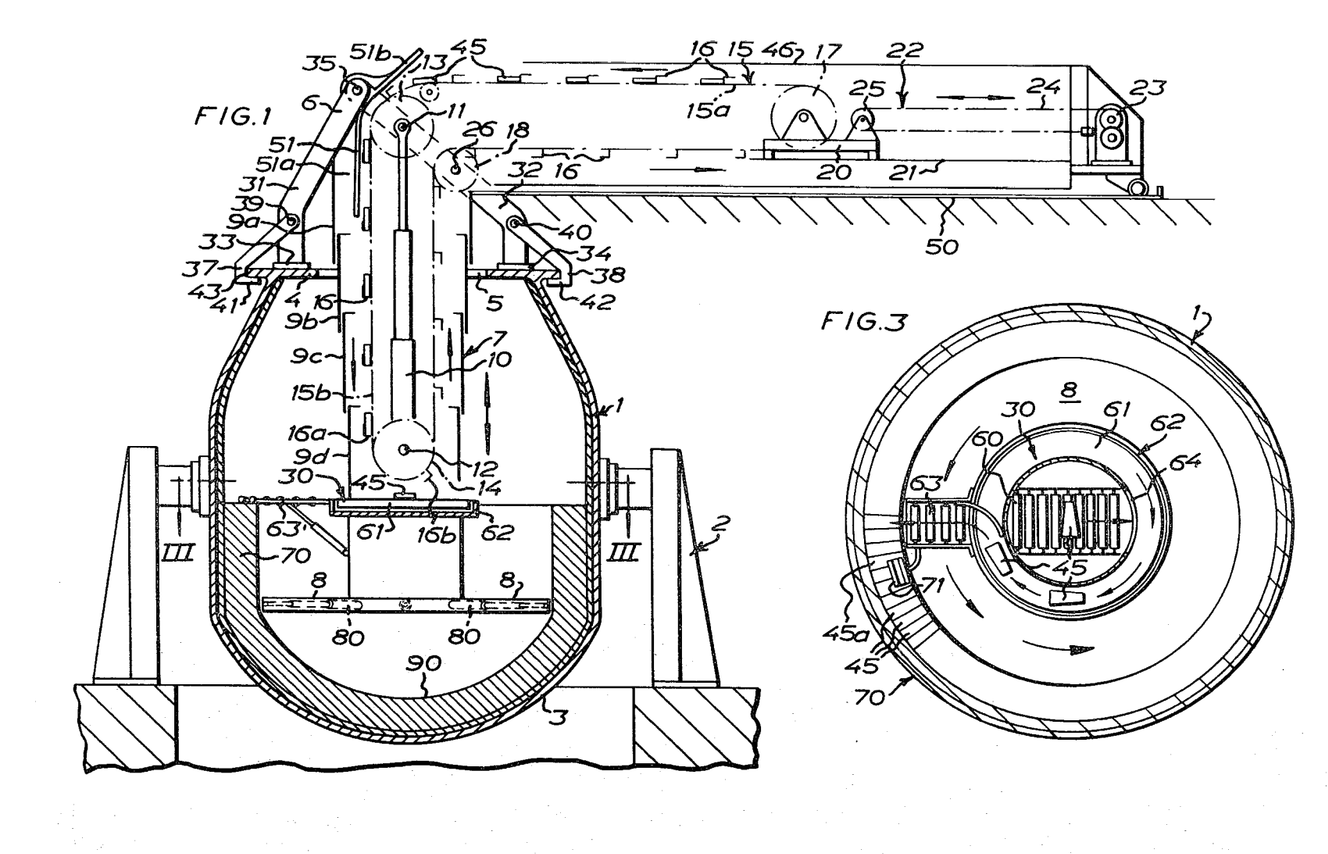
FIG. 1 is a schematic vertical section of a converter and a work facilitating apparatus according to the invention, with the working platform located at a relatively low level in the converter.
FIG. 3 is a schematic cross-section taken on the line III—III in FIG. 1.
Figure 2:
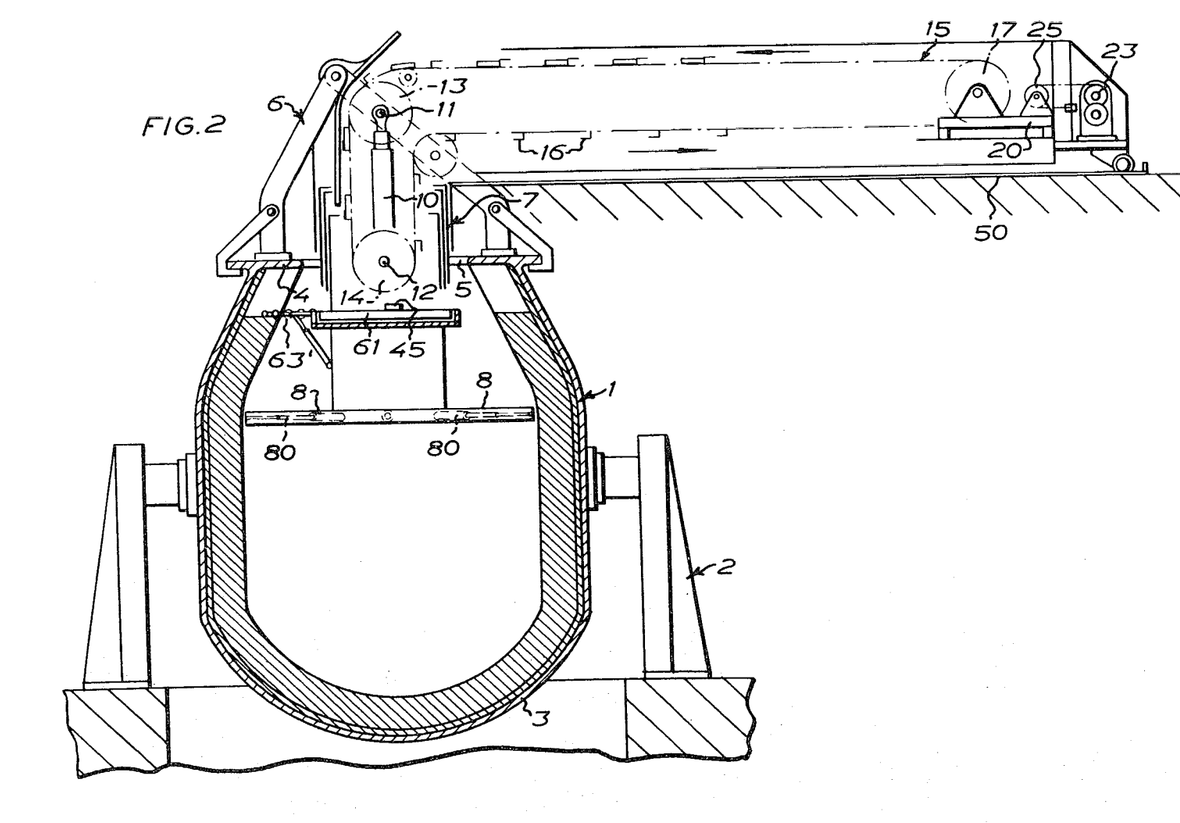
FIG. 2 is a view similar to FIG. 1 but showing the apparatus according to the invention for work at a higher level in the converter.

The suspending structure 7 preferably is in the form of a telescoping tube set which in the schematically illustrated embodiment in FIGS. 1 and 2 comprises four telescoping tubes 9a–9d which are shown as being of circular section in FIG. 3 but which could quite as well be of square or other suitable cross-section. The tube set is supported by at least one hydraulic telescoping cylinder 10 which is suspended at its upper end from a shaft 11 carried by the upper frame 6 and is connected at its lower end to a shaft 12 which is supported by the lowermost tube 9d. The shafts 11, 12 also constitute supporting shafts for sprockets 13 and 14, respectively, for an endless conveyor which is generally designated 15 and is in the form of a chain conveyor with entrainment means 16. The endless conveyor 15 includes a horizontal conveyor part 15a which at the outer end passes over a sprocket 17. From the sprocket 17 the horizontal upper run of the conveyor extends to the sprocket 13 carried by the upper frame 6 and forming a deflection pulley at the transition to the vertical part 15b of the conveyor, and from the lower sprocket 14 the conveyor extends in an upward direction and about a deflection pulley 18 at the transition to the lower horizontal run of the conveyor. The sprocket 17 at the outer end of the horizontal part 15a of the conveyor is supported by a carriage 20 which is movable along a guide 21 and to which a stretching device generally designated 22 is connected. This stretching device comprises a motor driven winch 23 with a rope transmission 24 which passes over a rope drum 25 disposed on the carriage 20. This stretching device substantially corresponds to a corresponding stretching device disclosed in the above U.S. Patent, for which reason it is not described in greater detail here. It may be mentioned, however, that such device automatically senses the stretching tension in the conveyor 15, keeping such tension constant.

The deflection pulley 13 is mounted on the shaft 11 and the deflection pulley 18 is mounted on a shaft 26, which shafts as already mentioned are carried by the upper frame 6. The sprocket 14 at the lower end of the vertical part 15b of the conveyor 15 is mounted on the shaft 12 which is carried by the lower tube section 9d.

As a drive for the conveyor use can be made of an electric motor (not shown) for operating the sprocket 17. The normal direction of travel of the conveyor will appear from the arrows inserted in FIG. 1. The motor should, however, permit being reversed.

The tube set 7 can be lengthened or shortened by means of the telescoping cylinder 10 in a manner appearing from a comparison between FIG. 1 and FIG. 2. The tube set 7, the working platform 8, the conveyor 15 and the stretching device 22 agree in principle with corresponding means according to the above U.S. Pat. No. 4,033,463, with the difference, however, that the tube set 7 is of a special design so as to permit being supported in a frame in a position depending therefrom and to support the platform in a depending position. Further, the vertical part 15b of the conveyor is adapted to convey the material in a downward direction, but this possibility of utilizing the conveyor is mentioned in the above U.S. Patent.

In the embodiment illustrated in FIGS. 1–3 the upper frame 6 consists of a number of hingedly interconnected legs 31, 32. Only two frame legs 31, 32 are shown, but in practice the frame should include at least three such legs to ensure good stability. The legs 31, 32 are provided in the illustrated embodiment with foot plates 33, 34 for engagement with a base which, as already mentioned, in the present instance is an annular plate 4 at the upper end of the converter. The frame legs 31, 32 are hingedly interconnected at 35 to permit adaptation of the distance between the foot plates 4, 5. Further, the frame has a device for locking the frame to the converter 1. This device includes link arms 37, 38 which are hingedly connected at 39, 40 to the respective frame legs 31, 32 and have hook-shaped end portions 41, 42 to grasp a collar 43 at the upper end of the converter 1. Locking of the link arms can be realized for instance by means of screw devices (not shown) between the frame legs 31, 32 and the link arms 37, 38.

Should the converter 1 not originally be equipped with an upper abutment such as the annular plate 4, and a collar 43, the converter can readily be equipped with such devices which can be fixed to the converter by welding. In the event that the converter 1 is supported beneath some suitable suspending structure such as a bridge or the like, the upper frame 6 can be carried by such structure.

To preclude any potential risk that material, such as bricks 45 conveyed by the entrainment means 16 of the conveyor may cause injuries to persons by falling from the conveyor 15, conveyor 15 is surrounded by a protective device which along the vertical part 15b of the conveyor is constituted by the tube set 7 and along the horizontal part 15a of the conveyor by a tunnel-shaped housing 46 which forms a frame for the carriage 20 and the stretching device 22. The housing 46 can be supported in horizontal or inclined position in any manner suitable with regard to the site of the converter 1. In the embodiment illustrated in the drawings a supporting device is shown as a supporting surface 50 which may be a supporting surface of a suspending structure surrounding the converter 1, such as a bridge or like structure, but the supporting device 50 may also be a frame which supports the housing 46 at the outer end thereof. The housing 46 may be supported in a depending position by some suitable device.

For the supply of building material (bricks, mouldables or the like) to the conveyor 15 use can be made of a loading device of the type described in the above U.S. Pat. No. 4,033,463.

As protective means at the transition between the horizontal and vertical parts 15a, 15b of the conveyor 15 the upper frame 6 at this point carries a baffle 51 which extends down into the tube set 7 with a vertical part 51a and extends obliquely upwardly with an upper part which forms a baffle 51b above the sprocket 13.

If for instance a brick tends to leave the conveyor 15 at the transition from the horizontal to the vertical conveyor part, the baffle 51 retains the brick so that it is again caught by the respective entrainment means. Should the brick nevertheless fall down it is guided in such a way that it is forced to fall down inside the tube set 7 without injuring personnel on the working platform 8.

The conveyor 15 can be formed by parallel chains with entrainment means 16 carried between the chains. Each of the entrainment means may consist of two or more relatively spaced transverse fingers bent substantially at right angles, of the shape illustrated in FIG. 5.

As will appear from FIGS. 1 and 2 the bricks are carried along on the horizontal upper part 15a of the conveyor by their engagement with the rear faces of the entrainment means 16, which faces will be the front faces in the horizontal conveyor part 15a. At the transition from the horizontal to the vertical direction of conveyance, gravity and the baffle means 51, by serving as guide means, see to it that each brick is automatically transferred from a trailing entrainment means 16 to the bottom of the pocket formed by the leading entrainment means 16 at the downwardly travelling vertical conveyor part 15b. This will appear by a study of the positions of the bricks 45 before and after the sprocket 13 in FIGS. 1 and 2.

The problem of conveyance one encounters at the transition from horizontal conveyance to vertical conveyance in a downward direction has thus been solved in a surprisingly simple manner with the use of the same type of conveyor as that described in U.S. Pat. No. 4,033,463.

At the lower end of the vertical part 15b of the conveyor the material advanced by the entrainment means 16 will be quite simply delivered to the receiving station 30 on a receiving surface therein by the entrainment means 16 being turned from the position 16a to the position 16b according to FIG. 1. The receiving surface in the receiving station 30 may be a horizontal conveyor 60, preferably a roller conveyor (see FIG. 3), which conveys the received material to an annular conveying disk 61 which is carried by the lower tube section 9d and which is rotatable thereabout. The conveying disk 61 may be of the construction illustrated and described in above-mentioned U.S. Patent.

The annular conveying disk 61 is surrounded by a preferably rotary ring 62 which forms a frame for a roller table 63 which may be of substantially the same design as the roller table 16 the above-mentioned U.S. Patent.

The horizontal roller conveyor 60 in the lowermost tube 9d of the tube set 7 feeds the material through an opening 64 in the tube 9d to the rotary annular disk 61 which is located on a convenient working level above the working platform and from which the material is transferred to the roller table 63 which is manually rotatable about the tube set to conduct the material to the place of laying.

As shown in FIG. 3 the roller table 63 is supported at its outer end on the masonry 70 by one or more supporting rollers 71 which are preferably situated after the roller table 63 in the direction of movement of the roller table indicated by an arrow in FIG. 3 and roll on the layer of the masonry being laid, whereby the bricks 45 supplied to the roller table 63 can readily be transferred in turn of order to and be laid after each other around the inner side of the converter.

The masonry can be built up helically to facilitate laying the bricks as the roller table 63 (which is vertically supported in relation to the annular rotary supporting device 62) receives continuous support at its outer end by the supporting rollers 71 rolling on the masonry. After each elevation of the working platform 8 by one step the roller table 63 may initially have downward inclination towards the masonry 70 (see FIG. 8) and when the downward inclination has ceased and the roller table 63 extends horizontally (or even has a small upward inclination), the platform 8 can be elevated by a further step.

To permit adaptation of the length of the roller table 63 the rollers thereof can be carried on an extensible supporting device (see FIGS. 4 and 8) by hingedly jointed links 72. Alternatively, the roller table 63 may be telescopically extensible, or extensible by addition of roller table sections.

To preclude any possibility of movement between the frame legs 31, 32 and the upper end of the converter 1, such legs should permit being locked in relation to each other by a suitable locking device, placed for instance in the vicinity of the joint 35, and moreover the arms 37, 38 should permit being locked in the positions in which they are shown in FIGS. 1 and 2. Such locking can be effected for instance in relation to the frame legs 31, 32 by means of a suitable screw device (not shown) or for instance a hydraulically operated locking device. In addition, arms of a type similar to the arms 37, 38 may be provided for locking engagement with the inner edge of the plate 4. The arms 37, 38 may possibly be arranged as stretching screws or otherwise for stretching so that the frame legs are clamped against the plate 4 (or a corresponding supporting surface).

It should be noted that the supporting device 21 for the horizontal conveyor part of the conveyor 15 may, if desired, be pivoted to the upper frame 6 to permit adaptation to a supporting base, such as 50.

It is also conceivable to support the horizontal conveyor part 15a in an inclined position, in which case the expression "horizontal" is not fully accurate in a geometrical sense, but is adequate in so far as the conveyor part 15a permits moving the material between two points which are spaced apart in a horizontal plane. It is even conceivable to arrange the "horizontal" conveyor part in such an inclination, possibly via deflection points in the area between the return sprocket 17 and the upper frame 6, so that the building material can be moved from floor level to a level above of the converter 1 and from there to the receiving station 30.

The apparatus according to the invention can be utilized in most of the available types of converters or like apparatuses which have an opening at the top or which can be turned so that they have an upwardly facing opening during the lining operation.

As will be realized from a study of FIG. 2 it shall be possible, once the lining work has been concluded, to move the working platform 8 up through the opening 5 at the upper end of the converter, which means that the diameter of the working platform 8 (which is extensible and contractible for instance by means of hydraulic cylinders 80) can be reduced so that the outer rim of the working platform goes free from the masonry when the platform is withdrawn. As the platform is contractible it can be used by the personnel for erection of the lining up to the upper end of the converter. The working platform can be allowed to rest on the masonry in each working position to ensure lateral stabilization.

IN FIGS. 4-8 use is made of the same reference numerals as in FIGS. 1-3 to designate identical or substantially identical devices and means.

Figure 4:
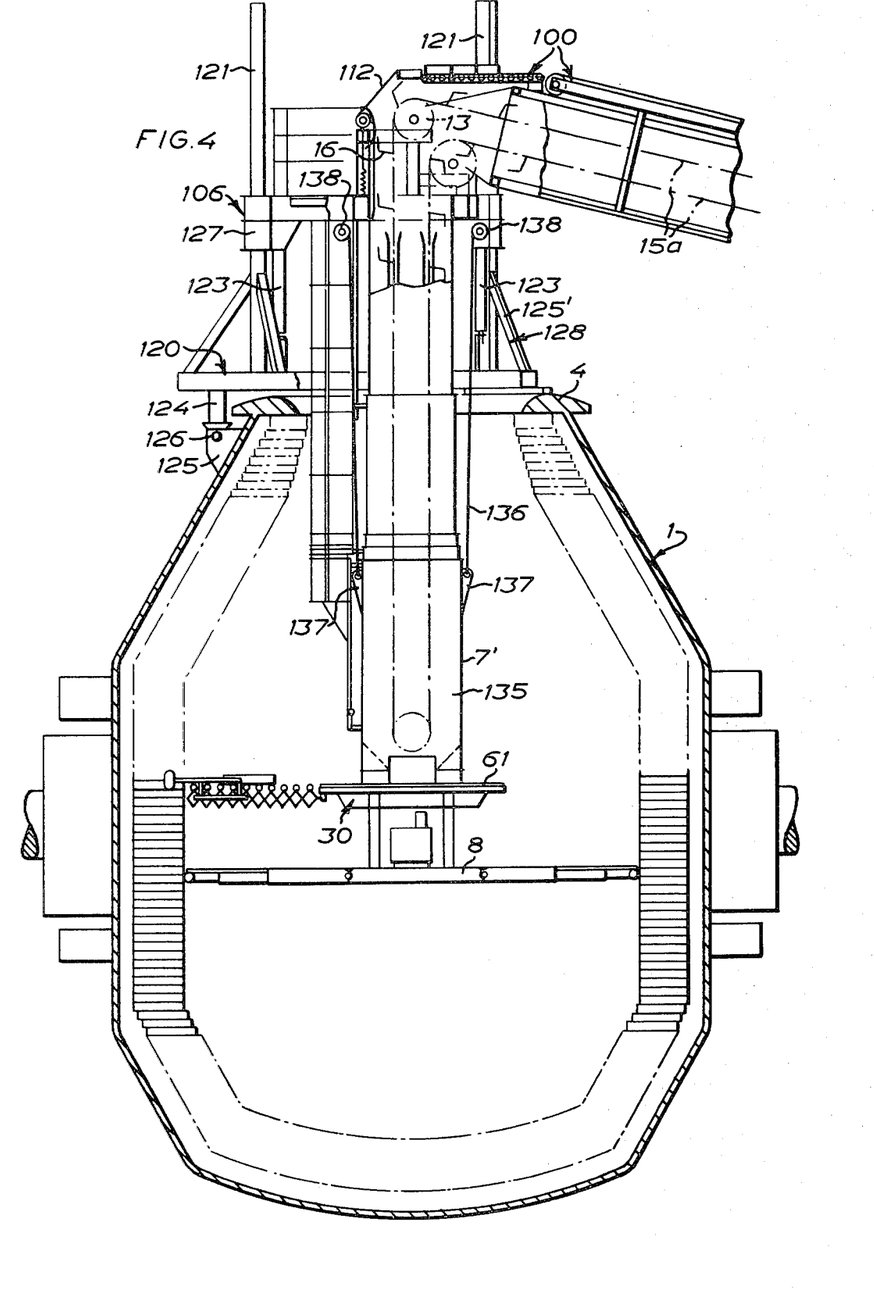
FIG. 4 is schematic vertical section of a modification of the embodiment illustrated in FIGS. 1–3.
Figure 5:
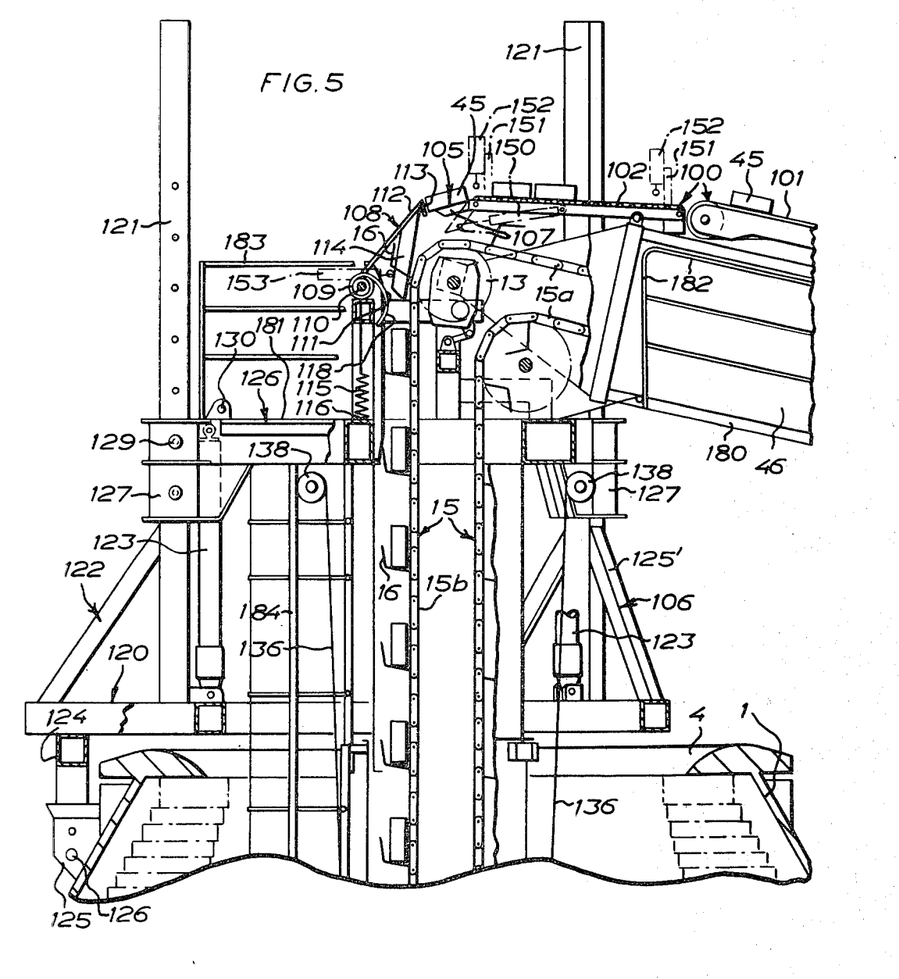
FIG. 5 is a schematic partial section on a larger scale and in more detail showing the upper frame and the upper part of the conveyor in FIG. 4.

As illustrated in FIGS. 4 and 5 the endless conveyor 15 can be supplemented with a conveyor device 100 on which the material can be transported to the vertical part of endless conveyor 15. In the embodiment illustrated in FIG. 4 this conveyor device 100 comprises a belt conveyor 101 and a roller or belt conveyor 102. The conveyor device 100 can take over the conveying function of the horizontal or inclined part 15a of the conveyor 15 but cannot compensate for the function with which the conveyor part 15a is endowed to permit lengthening and shortening of the vertical part 15b of the conveyor 15 and to keep part 15b stretched irrespective of the length thereof.

In the embodiment illustrated the belt conveyor 101 is supported on, or if desired inside, the tunnel-shaped housing 46 which embraces the horizontal or inclined conveyor part 15a. The conveyor 102 is supported by the upper frame 106 which is of a modified design with regard to the upper frame 6 in the embodiment illustrated in FIGS. 1-3.

Figure 6:
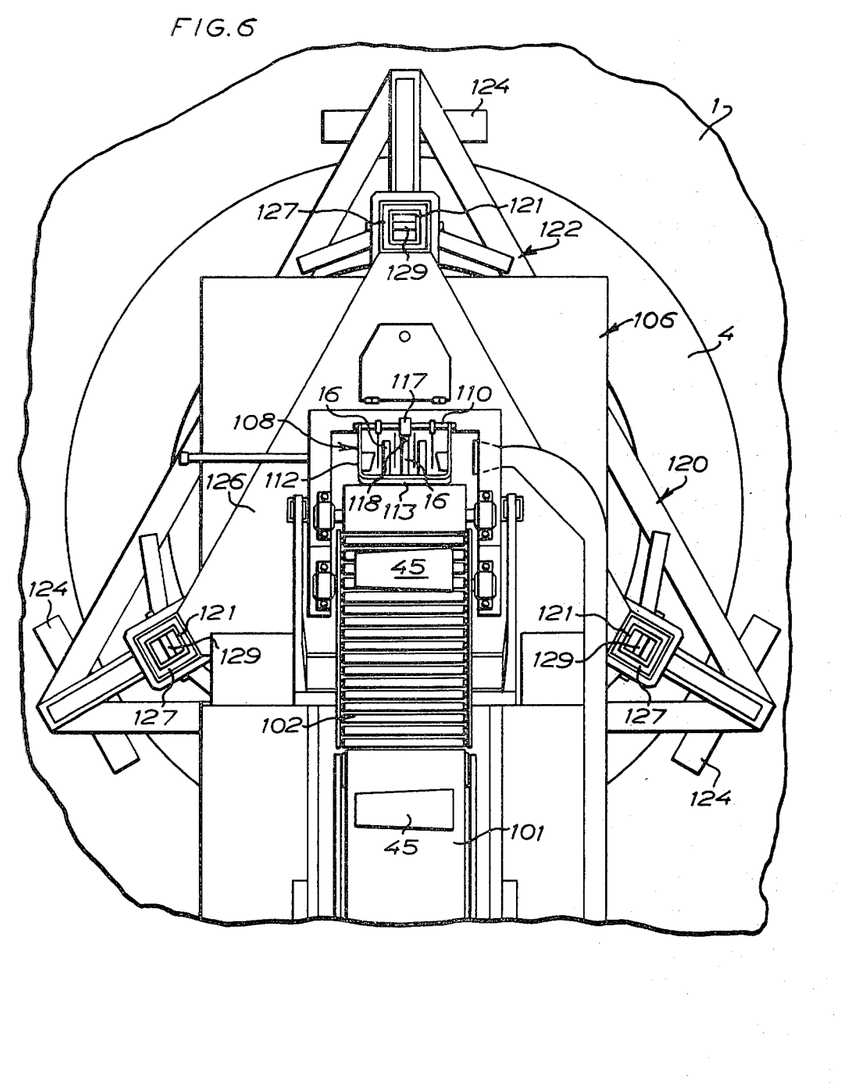
FIG. 6 is a plan view of the upper frame and the upper part of the conveyor in FIG. 5.

The belt conveyor 101 extends along the housing 46 to a loading station (not shown) where material is loaded onto the conveyor 101, and the blet conveyor 102 extends from the outer end of the belt conveyor 101 to a delivery station at 105. The delivery station 105 includes a slide plate 107 fixed to the front end of the conveyor 102 and located above the place where the conveyor 15 passes over the sprocket 13. Further, the station 105 comprises movable stop means 108 which is hingedly mounted by hinge means 109 to a shaft 110 connected to the upper frame 106. As shown in FIG. 6, the stop means 108 is a U-shaped frame 112 the arm ends of which are hingedly connected to the shaft 110 and the web 113 of which forms an abutment for further movement of a brick 45 which has been advanced from the belt conveyor 102 (FIG. 5) to the plate 107. On either side of the path of movement of a brick 45 from the FIG. 5 position on the plate 107 to an entrainment means 16 on the conveyor 15, lateral guides 114 are connected to the frame 106. The pivotally mounted U-shaped stop frame 112 is retained in the stop position of FIG. 5 by a spring 115 one end of which is connected at 116 to part of the frame 106 while the other end of the spring is connected to the pivotally mounted frame 112 at such a point of action 117 (FIG. 6) that the spring actuates the frame 112 with a sufficient moment arm to swing the frame back counterclockwise to the position shown in FIG. 5 in which the frame 112 bears against an abutment 111. Connected to the frame 112 is a curved lever arm 118 in the form of a curved leaf spring the curved portion of which lies in the path of movement of a brick 45 which is transferred from the belt conveyor 102 (FIG. 5) to an entrainment means 16 of the vertical part 15b of the conveyor 15.

When a brick 45 arrives in the position shown in FIG. 5 on the slide plate 107 the brick is stopped by the stop means 108 (which can be moved aside) as a safety measure in order that it shall not be possible for a brick 45 to be transferred into application with a leading brick which engages an entrainment means 16. If such a situation could arise it would imply great risks of the conveyor 15 jamming or being damaged.

When a brick 45 reaches the slide plate 107 the brick is thus stopped only by the stop means 108. When a leading brick 45 on an entrainment means 16 travels past the lever arm 118, such lever arm is swung clockwise which results in that also the stop means 108, that is the frame 112, is swung clockwise so that its upper edge 113 goes free from the brick resting on the plate 107. Such brick can then slide forward through the frame 112 between the front edge 113 of the frame and the hinges 109, 110 thereof. The uppermost entrainment means 16 on which a brick rests already has then travelled so far downwards that the next following entrainment means lies in correct position for receiving the brick 45 passed by the plate 107, such brick being thus positively caught by an unoccupied entrainment means 16.

The device described above can readily be modified so as to positively pivot the stop means 108 into and out of the stopping position under the control of photo electric cell means (not shown) or limit switches 53, which are carried by the frame 106 and actuate an operating cylinder (not shown) for swinging the stop means 108 aside. Such an operating cylinder can be connected at one end to the frame and with its piston to the frame 112, solenoid operated valve means connected to the cylinder being actuated electrically by the switch or photoelectric cell means 153. The stop means 108 can be swung back by the spring 115 or by the operating cylinder.

In the embodiment shown in FIGS. 4-6 the frame consists of a triangular base 120, which is best seen from FIG. 6, and three columns 121 supported by base 120 and forming guides for a frame structure 122 which is movable up and down along the columns 121 by three hydraulic cylinders 123, only two of which are shown.

The base 120 is formed by three beams which constitute the sides of an equilateral triangle and which at the corners of the triangle are interconnected in pairs and to a foot 124 which rests on the uppper end of the converter 1 and is releasably connected to studs 125 welded to the converter 1 immediately beneath the ring 4 surrounding the upper opening of the converter.

For the releasable connection of the frame feet 124 to the studs 125 the latter can be provided with upwardly open recesses in which the frame feet 124 can be inserted. The studs 125 and the frame feet 124 may be provided with opposite holes through which locking bolts 126 can be inserted. If desired link arms (not shown), such as the link arms 37 in FIG. 1, may, in a manner the same as in the embodiment of FIG. 1, be connected to the base 120 of the frame and have the form of hooks to grasp a projecting edge of the ring 4. Locking of the link arms in the engaged position can be performed by means of any suitable locking device, such as a screw device, which can be operated manually or hydraulically.

The columns 121 of the frame are connected at their lower ends to the triangular base 120 and are rigidly united therewith by means of braces 125'. The raisable and lowerable frame portion 106 is a platform structure 128 which may be of triangular shape and is provided with three guide sleeves 127 through which the columns 121 extend. The columns 121 and the guide sleeves 127 can be provided with holes for the insertion of fastening bolts 129 to lock the raisable and lowerable platform 128 in the desired position along the columns 121.

To permit lifting of the upper frame 106 by means of a lifting device, such as an overhead travelling crane or like apparatus, the platform 128 is equipped with heavy lifting lugs 131.

The housing 46 through which the horizontal or inclined part 15b of the conveyor 15 extends, is carried at the end above the converter 1 by the raisable and lowerable platform 128.

The tube set 7' which depends into the converter and to the lower section 135 of which the platform 8 is connected, can be suspended in the embodiment of FIGS. 4-8 like in the embodiment of FIGS. 1-3 in the upper frame 106 by means of a telescoping cylinder, such as the telescoping cylinder 10 in FIGS. 1-3, but in the embodiment of FIGS. 4-8 use is instead made of a suspension device consisting of ropes 136 which are connected to studs 137 on the lowermost section 135 of the tube set, which section in the embodiment of FIGS. 4-8 has the largest diameter of the telescoping tubes, as distinct from the embodiment in FIGS. 1-3.

The ropes 136 extend up to motor-driven winches 138 carried by the upper frame 106. The tube set 7' can be elongated or shortened by means of the winches 138 to respectively lower and raise the platform 8 and the material receiving station 30 with its rotary annular disk 61, which are connected to the lowermost tube 135 of the tube set.

FIG. 5 shows by broken lines a modification of the device for controlled supply of bricks 45 to the vertical part 15b of the conveyor 15. In this modification the plate 107 is adapted to pivot from the position shown by full lines to the position shown by broken lines. Pivoting of the plate 107 to the position shown by broken lines can be realized by the weight of a brick 45 resting on the plate while return of the plate can be realized by means of a solenoid-controlled hydraulic cylinder 150.

A number of limit switches 152a, 152b are fastened on holders 151 in the upper frame 106 above the roller conveyor 102 the rollers of which are driven and which may be a belt conveyor. The limit switches sense the movements of the bricks 45 on the conveyor 102 via actuating means. In such a modification the stop means 108 need not be adapted to pivot but can have the form of a fixed abutment. Further, a limit switch 153 is mounted on the upper frame 106, such switch sensing the movements of the entrainment means 16 past it.

When an entrainment means 16 goes past the limit switch 153 and in its passage first actuates the sensing means of such limit switch, the circuit of both or one of the limit switches 152a, 152b is opened so that such switches will be inoperative. After an entrainment means 16 has gone past the limit switch 153 the circuit of the two limit switches 152a, 152b is again closed. Should the leading one 152a of the two limit switches 152a, 152b then sense the presence of a brick 45 an actuating pulse is sent to the cylinder 150 which is thereby caused to pivot the plate 107 to the position shown by broken lines, whereby a brick 45 on plate 107 slides downwardly on plate 107 and is caught by the nearest entrainment means 16 to be conveyed further down to the receiving station 30. The trailing limit switch 152b may have the task of controlling the operation of the belt conveyor 101 so that conveyor 101 is driven so as to advance bricks 45 when the trailing limit switch 152b does not sense the presence of a brick under its sensing means.

Figure 7:
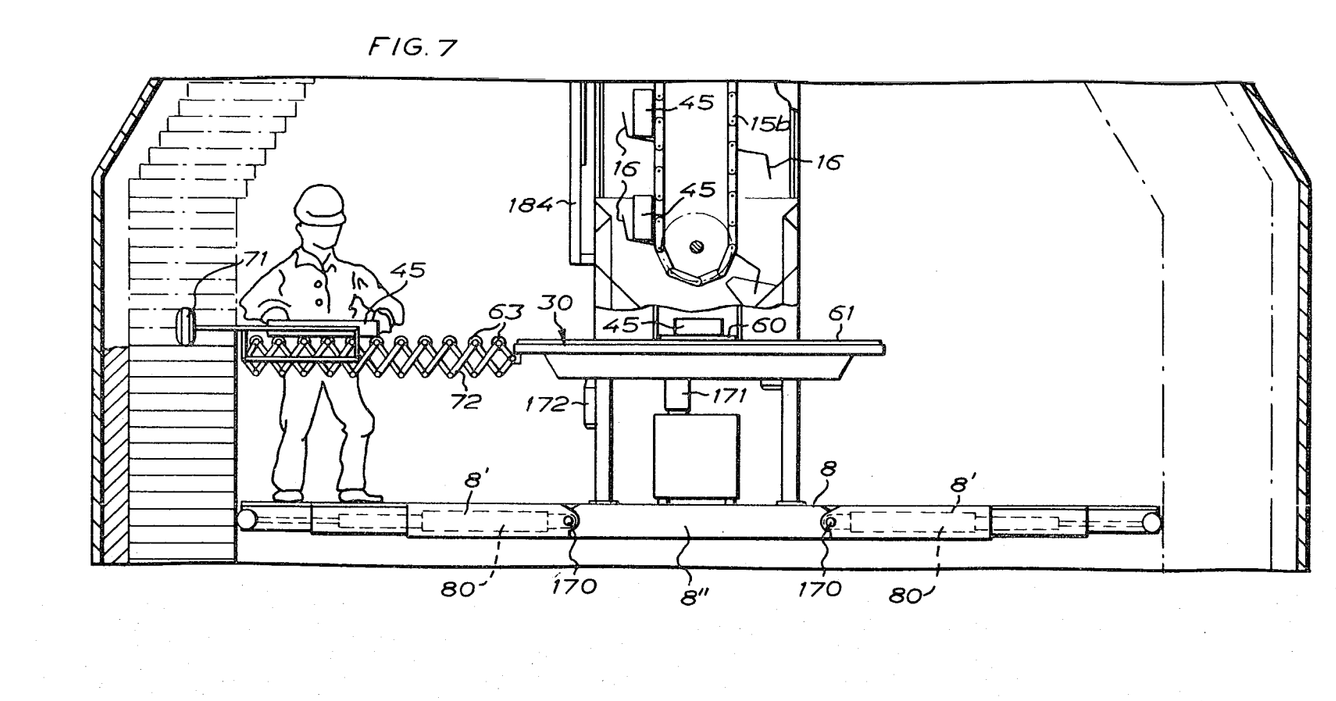
FIG. 7 is a schematic partial section on a larger scale showing the working platform and the lower part of the tube set and the conveyor in FIG. 4 and illustrates how material is conveyed from a receiving station beneath the lower end of the conveyor to the place of laying the material at the inner side of the converter.
Figure 8:
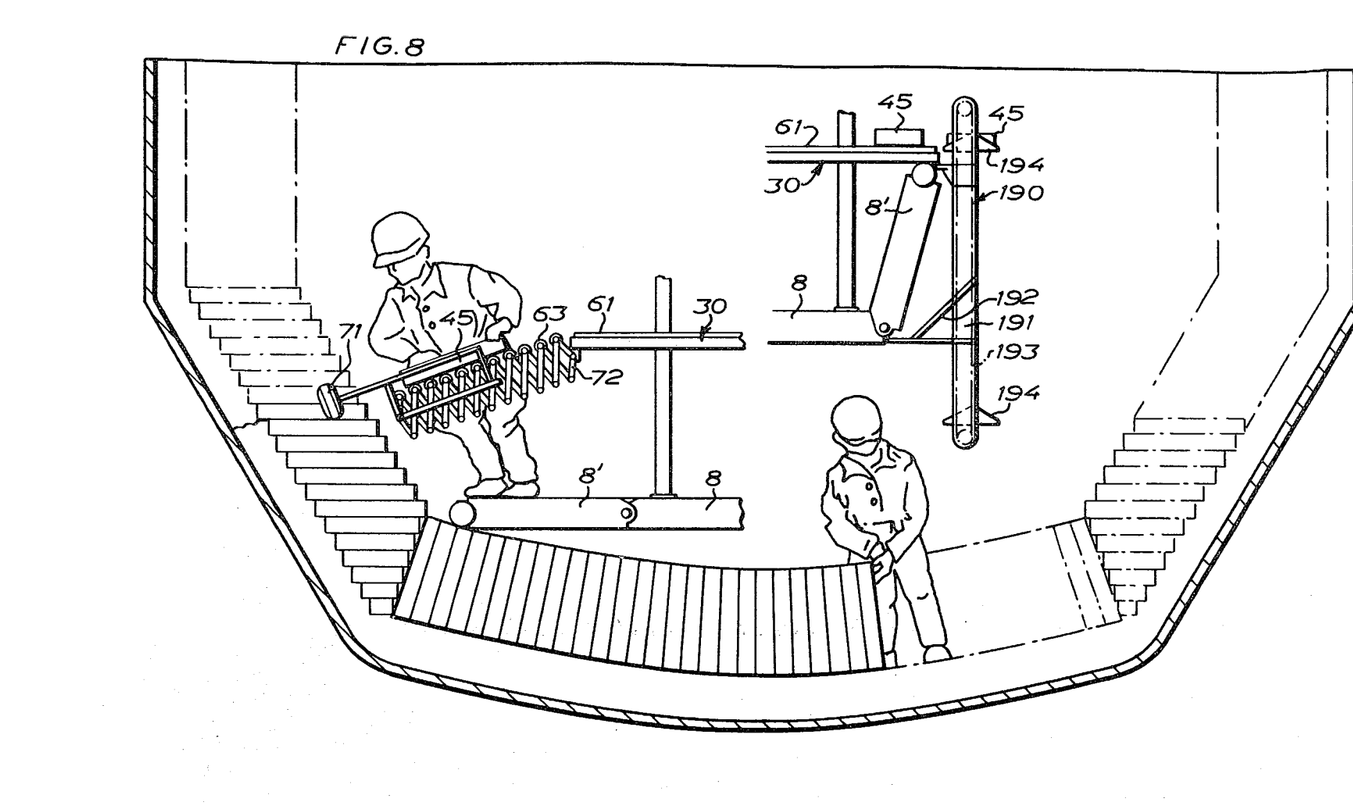
FIG. 8 is a view similar to FIG. 7, but illustrating how work is effected in the lower portion of the converter.

As shown in FIGS. 7 and 8 the platform 8 is provided with raisable platform sections 8' which are elongatable or shortenable by means of hydraulic cylinders 80 as in the embodiment shown in FIGS. 1-3. The raisable platform sections 8' are hingedly connected at 170 to a central portion 8" of the platform 8 and can be swung upwardly into vertical positions to facilitate insertion and withdrawal of the platform through the upper end of the converter.

In FIG. 7 there is shown at 171 a motor for operating the roller conveyor 60 and at 172 there is shown a motor for operating the rotary disk 61 from which the bricks 45 are transferred to the elongatable and shortenable conveyor 63 which is slidably mounted at the periphery of the receiving station 30 and can be moved by a worker on the platform about such periphery.

FIGS. 1 and 2 show a modification in which the roller conveyor 63' is formed by a roller table of definite length, which if need be can be shortened or elongated by removal or addition of sections.

In FIGS. 4 and 5 there are shown at 180 and 181 gangways for personnel, at 182 and 183 guard rails, and at 184 a ladder leading from the upper platform 128 down to the working platform 8.

FIG. 8 shows a small auxiliary conveyor 190 by means of which bricks can be transferred from the receiving station 30 to workers who are standing on the bottom of the converter 1 when the lining of the converter 1 commences. The conveyor 190 comprises a frame 191 which is supported by a holder 192 connected to the receiving station 30. The conveyor 190 comprises a conveyor belt 193 having two pockets 194 spaced a distance apart which substantially corresponds to the length of the conveyor. The conveyor belt is driven by the weight of a brick 45 placed in the upper pocket so that the brick is lowered to a level at which it can be received by the worker. The conveyor 190 may be a driven or non-driven conveyor. If the conveyor 190 is not driven the rollers about which the belt 193 passes at the opposite ends of the conveyor 190 should be adapted for a certain friction to decelerate the movement of a brick-loaded pocket 194 in the downward direction. While work is performed at the bottom of the converter the outer sections 8' of the working platform 8 are swung upwards to the positions in which they are shown in the right-hand portion of FIG. 8. Bricks can be moved manually from the rotatable annular disk 61 to the pockets of the conveyor 190 by a worker who is standing on the middle section 8" of the platform 8.

The embodiments and the modifications thereof which are described in the foregoing are preferred embodiments of the apparatus according to the invention, but it should be observed that as for details the invention is not limited to the embodiments described above and illustrated in the drawings but can be modified by those skilled in the art within the scope of the invention.

What I claim and desire to secure by Letters Patent is:

1. An apparatus for conveying material from a higher level to a lower level through an upper opening in a metallurgical container, such as a converter, a metallurgical furnace or a holding furnace, particularly material in the form of bricks for providing the metallurgical container with a refractory lining, said apparatus comprising:

a vertically suspended structure formed of plural relatively vertically telescopically movable sections;

a working platform supported by said structure at a lower said section thereof;

an upper frame including means for supporting said upper frame to the upper end of the metallurgical container and means for supporting said structure and said platform in a manner to depend from said upper frame downwardly into the metallurgical container;

an outer support means extending from a position outside of said upper frame to said upper frame, said outer support means including an elongated guide means;

a movable supporting device supported by said outer support means for adjustable movement along said elongated guide means, said movable supporting device being adjustably positionable at plural fixed locations relative to said elongated guide means;

an endless chain conveyor having plural material entrainment means;

first chain conveyor guide means supported by said movable supporting device;

second chain conveyor guide means supported by said upper frame;

third chain conveyor guide means supported by said structure at a level above said platform;

said endless chain conveyor being guided by said first, second and third chain conveyor guide means in an endless path extending between said movable supporting device and said upper frame and therefrom vertically into and through said structure to said level above said platform, the vertical portion of the conveyor loop of said endless chain conveyor between said second and third chain conveyor guide means being elongatable and shortenable by movement of said movable supporting device and said first chain conveyor guide means along said elongated guide means; and means for transferring material from outwardly of the metallurgical container to said endless chain conveyor at a position located above the metallurgical container and above said vertical portion of said endless chain conveyor, said transferring means including a transportation path extending from a first location positioned outwardly of and adjacent a first part of said vertical portion of said endless chain conveyor which during operation moves vertically upwardly between said third chain conveyor guide means and said second chain conveyor guide means to a second location at a level for transferring material over said second chain conveyor guide means to a second part of said vertical portion of said endless chain conveyor which during operation moves vertically downwardly between said second chain conveyor guide means and said third chain conveyor guide means.

2. An apparatus as claimed in claim 1, wherein said transferring means comprises a part of said endless chain conveyor moving between said first and second chain conveyor guide means, and said entrainment means are so arranged that front faces of said entrainment means, taken in the direction of motion of said endless chain conveyor, comprise material entrainment surfaces for moving said material between said first and second chain conveyor guide means, and rear faces of said entrainment means facing in a direction opposite to said direction of motion comprise material supporting surfaces for supporting said material between said second and third chain conveyor guide means, and further comprising a transfer device to guide said material from said front face of a trailing said entrainment means to the said rear supporting face of an adjacent leading said entrainment means in an area adjacent said second chain conveyor guide means.

3. An apparatus as claimed in claim 1, wherein said transferring means includes a movable stop means which is movable from a free position to a stop position in the path of movement of material to said second part of said vertical portion of said endless chain conveyor, sensing means for sensing the movement of said entrainment means past a definite point adjacent said second chain conveyor guide means, and operating means for moving said stop means between said stop position and said free position in response to operating pulses from said sensing means.

4. An apparatus as claimed in claim 1, wherein said upper frame comprises at least three frame legs to support said upper frame on a base, and locking means for locking each said frame leg to said base.

5. An apparatus as claimed in claim 4, wherein said frame legs are hingedly interconnected at their upper ends by hinge means, and each said frame leg has at a lower end portion thereof arm or link means which is adapted to grasp a projection connected to a supporting surface for the respective said frame leg.

6. An apparatus as claimed in claim 5, for facilitating the lining of converters, wherein said upper frame rests on the upper end of an upwardly open converter with said suspended structure supporting said working platform extending from above downwardly through the upper opening of the converter, and with said working platform located inside the converter.

7. An apparatus as claimed in claim 6, wherein said lower ends of said frame legs of said upper frame are adapted to engaged a supporting surface connected to the upper end of the converter, and said arm or link means for each said frame leg is adapted to engage a projecting edge connected to the upper end of the converter, said arm or link means including locking means for locking the respective said frame leg in a supporting position.

8. An apparatus as claimed in claim 1, wherein said second chain conveyor guide means comprises two deflection pulley means for respectively guiding two opposite runs of said endless chain conveyor in the area of transition between a horizontal or inclined outer conveyor portion and said vertical conveyor portion, and further comprising, in the area of the said deflection pulley means for deflecting said endless chain conveyor to said second part of said vertical portion thereof, baffle and guide means extending into said suspended structure for guiding the material conveyed by said endless chain conveyor.

9. An apparatus as claimed in claim 1, wherein said chain conveyor includes an upper run of an outer horizontal or inclined conveyor part and is adapted on said upper run to convey the material by taking the material along by means of front ends of said entrainment means, as viewed in the direction of movement of said endless chain conveyor, said front ends being so arranged as to form carrying means in said second part of said vertical portion of said endless chain conveyor, said transferring means being adapted, at the transition from said horizontal or inclined conveyor part to said vertical portion, to prevent the material being conveyed from sliding down onto said working platform and to guide the material being conveyed from a trailing to a leading said entrainment means during an automatic shifting, caused by gravity, of the material at said transition.

10. An apparatus as claimed in claim 1, wherein said plural sections of said suspended structure comprise a set of tubes which are telescopically extensible by means of a telescoping cylinder unit, said set of tubes being adapted to prevent material from sliding down from said endless chain conveyor to the region of said working platform.

11. An apparatus as claimed in claim 10, wherein the lowermost said tube supports said third chain conveyor guide means.

12. An apparatus as claimed in claim 1, wherein said outer support means supports an outer horizontal or inclined conveyor part of said endless chain conveyor, said outer support means comprises a housing for said horizontal or inclined conveyor part, and said horizontal or inclined conveyor part is supported at an outer end thereof by a wheel assembly which in turn is supported by means of a carriage movable along said housing and adjustable by tensioning means keeping said endless chain conveyor stretched and adapted to allow elongation and shortening of said vertical portion thereof.

13. An apparatus as claimed in claim 1, wherein said vertical portion of aid endless chain conveyor is adapted to deliver the material being conveyed onto a receiving conveyor as a result of said entrainment means being turned through 180° in the area of transition between said second part and said first part of said vertical portion.

14. An apparatus as claimed in claim 13, wherein said receiving conveyor comprises a roller conveyor supported in said suspended structure and adapted to feed the material being conveyed through an opening to an annular supporting surface which surrounds said suspended structure, said annular supporting surface being rotatable about a vertical axis.

15. An apparatus as claimed in claim 14, wherein said suspended structure supports a roller table rotatable about said annular supporting surface and having at an outer end supporting roller means for supporting said roller table on masonry erected with the building material conveyed to said roller table by means of said endless chain conveyor, said receiving conveyor and said annular supporting surface.

* * * * *